United States Patent [19]

Shumway

[11] Patent Number: 5,490,694
[45] Date of Patent: Feb. 13, 1996

[54] THREADLESS PIPE COUPLER

[75] Inventor: Paul W. Shumway, Avondale, Ariz.

[73] Assignee: American Fence Corp, Phoenix, Ariz.

[21] Appl. No.: 397,920

[22] Filed: Mar. 3, 1995

[51] Int. Cl.6 ................................................. F16L 37/14
[52] U.S. Cl. ........................ 285/305; 285/276; 285/321
[58] Field of Search ...................................... 285/305, 321,
285/276, 374; 403/326, 327

[56] References Cited

U.S. PATENT DOCUMENTS

| 472,342 | 4/1892 | Draudt et al. | |
| 497,374 | 5/1893 | Hay. | |
| 738,503 | 9/1903 | Waters | 285/321 |
| 1,097,850 | 9/1913 | Greer. | |
| 2,440,452 | 4/1948 | Smith | 285/321 |
| 2,525,667 | 10/1950 | Goolsbee et al. | |
| 2,760,258 | 8/1956 | Rieger. | |
| 2,805,089 | 9/1957 | Hansen. | |
| 3,177,019 | 4/1965 | Osweiler. | |
| 3,414,299 | 12/1968 | Roe. | |
| 3,637,239 | 1/1972 | Daniel | 285/321 |
| 3,718,350 | 2/1973 | Klein | 285/321 |
| 4,087,120 | 5/1978 | Rumble | 285/39 |
| 4,113,288 | 9/1978 | Cox | 285/276 |
| 4,138,146 | 2/1979 | Rumble | 285/39 |
| 4,304,424 | 12/1981 | Hansen. | |
| 4,401,324 | 8/1983 | Rumble | 285/90 |
| 4,570,980 | 2/1986 | Goward | 285/321 |
| 4,611,837 | 9/1986 | Aleck. | |
| 4,679,825 | 7/1987 | Taylor | 285/305 |
| 4,707,000 | 11/1987 | Torgardh | 285/305 |
| 4,768,837 | 9/1988 | Halder. | |
| 4,804,206 | 2/1989 | Wood et al. | 285/321 |

Primary Examiner—Randolph A. Reese
Assistant Examiner—Heather Chun Shackelford
Attorney, Agent, or Firm—Donald J. Lenkszus

[57] ABSTRACT

A pipe coupler for use in fire sprinkler systems is of generally cylindrical shape. The coupler carries locking springs to engage grooves carried on the ends of the sprinkler pipes. The coupler also carries seal rings to provide for leak proof coupling. The locking springs are carried in grooves which have sidewalls which are perpendicular to the inner surface of the coupler. The corresponding grooves on the pipes also have sidewalls which are perpendicular to the exterior surface of the pipe.

8 Claims, 2 Drawing Sheets

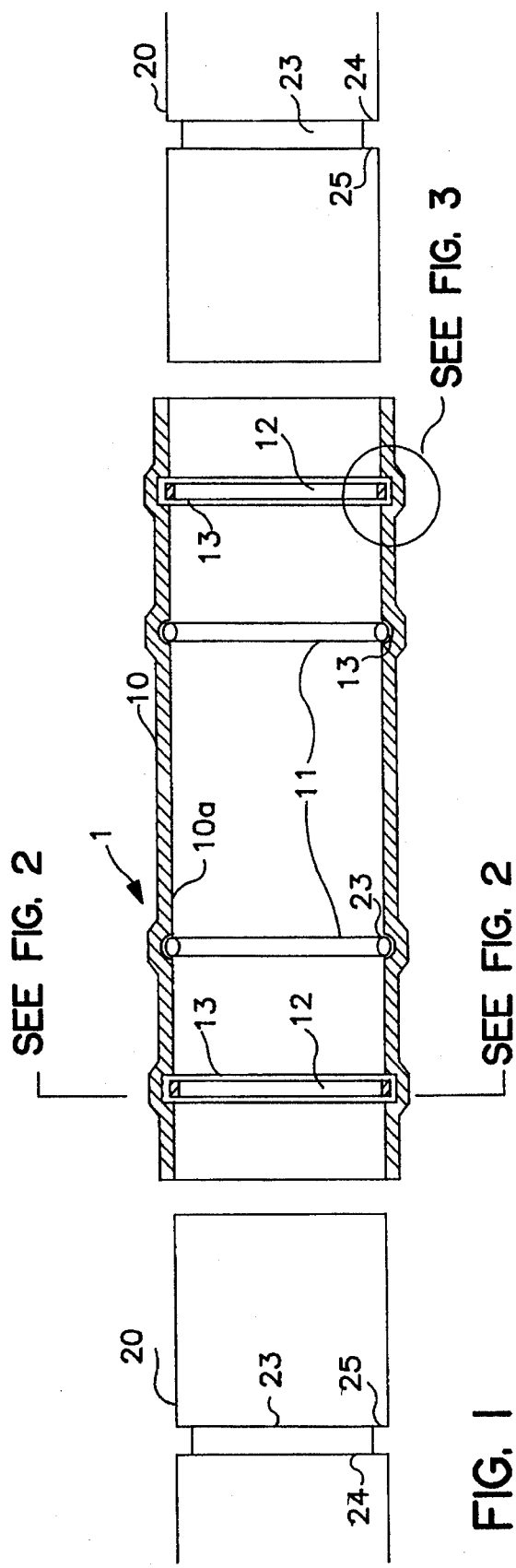
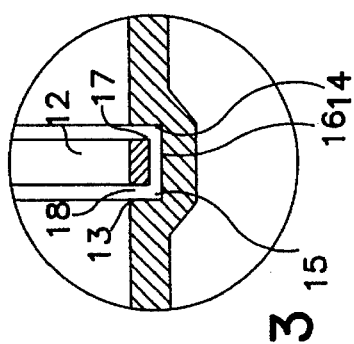
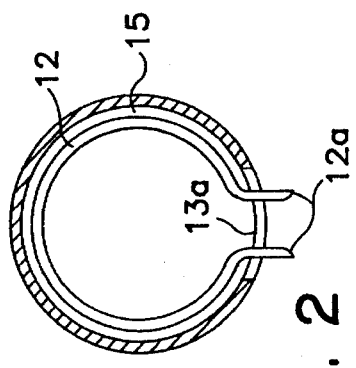

5,490,694

THREADLESS PIPE COUPLER

BACKGROUND OF THE INVENTION

This invention pertains to piping systems utilizing threadless coupling, in general, and to threadless couplers for building fire sprinkler systems, in particular.

Pipe sections which must be joined together to form a run of pipe for the flow of fluids therein must be free from leakage. Considerable care must be employed in selecting fittings which will properly form joints or couple adjacent sections of pipe. In addition, the fittings must securely fit and grip the pipe in a straight and leak free relationship.

These problems are particularly apparent in pipe runs which are utilized in building fire sprinkler systems. In these applications, the joined sections of pipe must be straight and aligned to prevent twisting and longitudinal separation.

It is desirable to provide an arrangement wherein pipe connections can be accomplished quickly and at relatively low cost.

Several arrangements have been proposed in the past to provide coupling arrangements. For example, in U.S. Pat. No. 4,304,424, an arrangement is described in which plain ends of pipe are connected with a coupler having a cutting member which penetrates the surface of the pipe.

It has been found that this is not a desirable coupler and therefore, it is one object of this invention to provide an improved coupler which easily and quickly connects adjacent pipe ends in an end to end or confronting relationship along a straight line.

It is another object of the present invention to provide a coupler wherein conventional tooling may be used to aid in the installation process.

SUMMARY OF THE INVENTION

A coupler in accordance with the principles of this invention comprises a generally cylindrical body which receives the ends of the pipes to be coupled.

The ends of the pipes to be coupled each have a circumferential groove of rectangular cross section formed on the exterior surface.

The coupler includes at each pipe receiving end an internal circumferential groove which carries a locking spring. The circumferential grooves receiving the locking spring in the coupler each are of rectangular cross section corresponding to that formed on each pipe end. The circumferential groves in the coupler are of such a depth so that the locking spring may be forced into the groove so that a pipe then can pass over the locking spring. The locking spring is preformed such that when the corresponding rectangular groove in the pipe end is in alignment with the locking spring, the locking spring will engage the groove on the pipe as well as a portion of the groove on the coupler to prevent longitudinal separation of the pipe. After the pipes and coupler are assembled, the locking ring will engage a sidewall of the pipe groove as well as a side wall of the coupler groove to limit axial movement of the pipe relative to the coupler.

The coupler also includes seals which are each carried in an internal circumferential groove spaced inwardly from each locking spring. Each seal provides a fluid tight seal with the end of the pipe.

With this arrangement, pipe ends may be quickly snap connected together to provide a highly reliable and quick installation of a fire sprinkler system.

BRIEF DESCRIPTION OF THE DRAWINGS

The invention will be better understood from a reading of the following detailed description taken in conjunction with the drawings in which:

FIG. 1 illustrates a coupler in accordance with the principles of the invention utilized to connect together two pipes;

FIG. 2 is a cross section taken along line 2—2 of the coupler of FIG. 1;

FIG. 3 illustrates in greater detail a portion of the coupler of FIG. 1;

DETAILED DESCRIPTION

Figure 5:
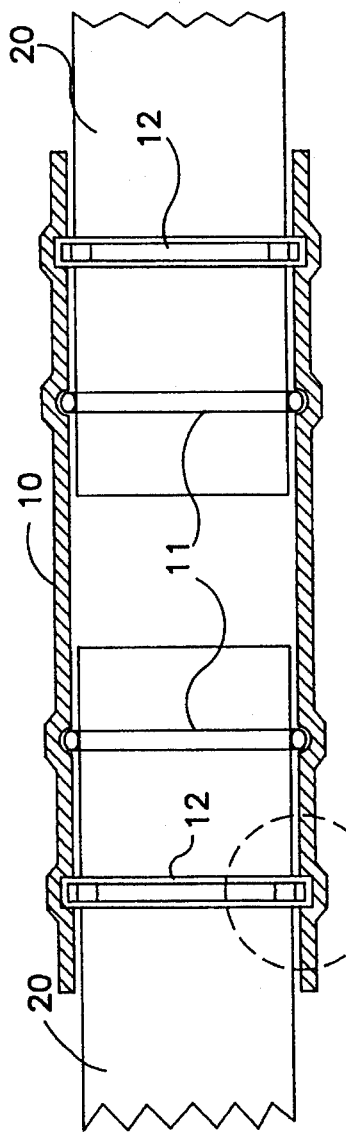
FIG. 5 shows in partial cross section the piping arrangement of FIG. 1 with the pipes inserted into and locked into place in the coupler.

Turning now to FIG. 1, a generally cylindrical coupler or connector 1 is shown. The coupler or connector 1 is formed of low carbon content steel as a cylinder 10.

Cold formed into the inner surface 10a at each end of the cylinder 10 is a rectangular shaped circumferential groove 13. The groove 13 includes side walls 14 and 15 which are perpendicular to and extending upward from the bottom 16 and are perpendicular to inner surface 10a.

Spaced inwardly of the grooves 13 are grooves 23 which are also cold formed into the interior surface 10a. The grooves 23 are of semicircular cross section.

Assembled into the semicircular grooves 23 are O ring seals 11. The O ring seals 11 may be of conventional material.

Inserted into each of the rectangular cross section grooves 13 are corresponding locking springs 12. Each locking spring has an at rest diameter which is less than the interior diameter of the pipe or cylinder 10. Each of the grooves 13 includes a notched out or window portion 13a through which arms of the snap ring 12 extend. The arms 12a may be of conventional configuration such that the arms 12a are either spread apart or pressed together in order to urge the snap ring 12 into engagement with the bottom surface 16 of the groove 13.

Figure 4:
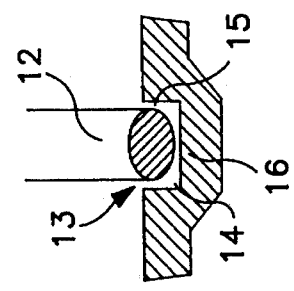
FIG. 4 illustrates in greater detail the same portion of the coupler of FIG. 3 and shows an alternate locking spring.

As shown most clearly in FIG. 3, the locking spring 12 is of a rectangular cross section. An alternate arrangement is shown in FIG. 4 in which the locking spring is of circular cross section. The cross section of the grooves 13 in the coupler as well as the cross section of the grooves 23 formed on the pipe are important as explained below.

Inserted into the cylinder or coupler 10 are the pipes 20. Each pipe 20 includes a circumferential groove 23 on its outer surface. Each circumferential groove 23 is of rectangular cross section and is of comparable width to the groove 13. The sidewalls of each groove 23 are perpendicular to the pipes outer surface.

As shown in FIG. 5, when each of the pipes 20 is inserted into the coupler 1, each locking spring 12 engages the corresponding circumferential groove 23 as well as internal circumferential groove 13 of the coupler. In addition, each O ring 11 seal engages the end section of the corresponding pipe 20 thereby forming a fluid tight seal. During insertion of the pipe 20 into the coupler 10, the arms 12a are moved such that the spring 12 rests in the groove 13. The pipe 20 can then pass over the locking spring 12. The arms 12a are released and locking spring 12 will ride on the external surface of the pipe 20 until groove 23 comes into alignment with groove 13. At that time, the locking spring 30 will snap into position in groove 23 such that it engages groove 23 as well as groove 13. Because the side walls 14, 15, and 24, 25 of the grooves 13 and 23 are perpendicular to the inner surface of the coupler and the outer surface of the pipe, respectively, the locking spring 12 will prevent any further axial movement of the pipe 20 relative to the coupler 1 and relative to each other. In addition, the O ring seal 11 will provide a fluid tight connection.

Figure 6:
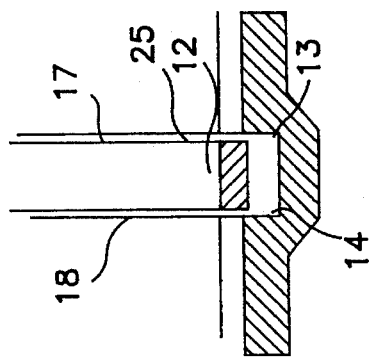
FIG. 6 shows in greater detail a portion of the assembly of FIG. 5.

FIG. 6 illustrates the portion of the assembly of FIG. 5 around one of the locking springs 12. In this assembly, a locking ring 12 of circular cross section is utilized. The assembly shown illustrates a sprinkler system which is pressurized. With the system pressurized, the locking spring 12 has one side 17 engage sidewall 25 of the groove 23 carried on the pipe 20 and its opposite side 18 engage the sidewall 14 of the coupler groove 13. As is readily apparent, with the system pressurized, no axial movement of the pipe 20 relative to the coupler 1 can occur.

Thus, a coupler provided in accordance with the invention will provide a positive snap locking coupling such that the pipes 20 may be connected into a fire sprinkler piping run. The fire sprinkler coupler may also be formed in other shapes to provide for the connection of pipes.

Figure 7:
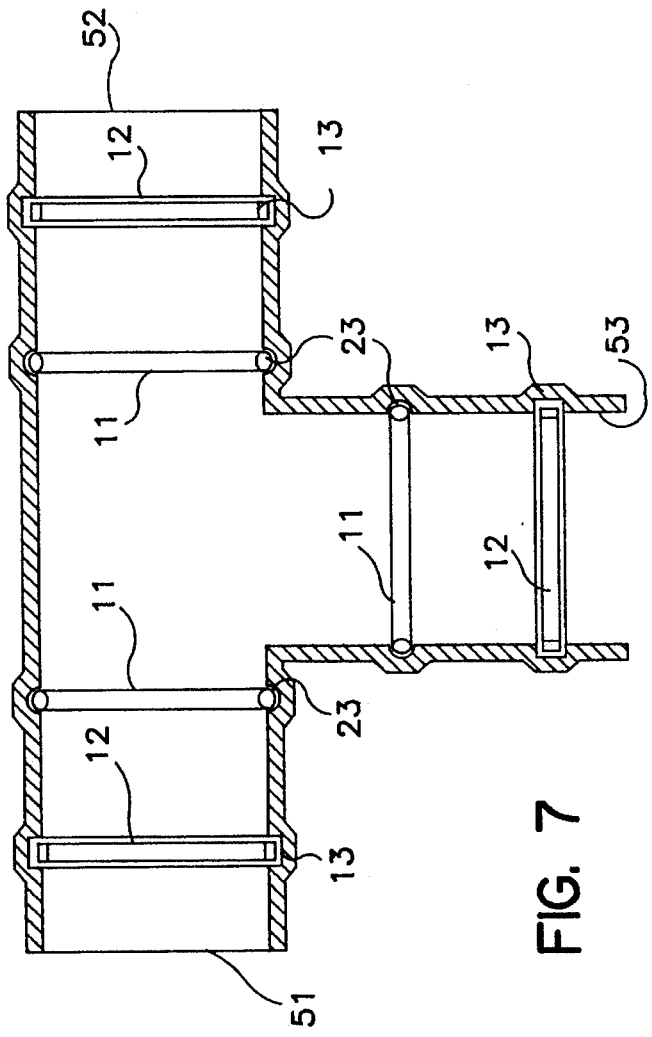
FIG. 7 shows in partial cross section a "T" shaped coupler.

In FIG. 7 a coupler in the shape of a "T" permits the connection of three pipes or, in some instances, to permit the connection of two pipes in the fire sprinkler line run and a drop to a sprinkler head.

In the coupler of FIG. 7, each of the three inlets 51, 52, 53 has locking spring 12 carried in a groove 13 and an O ring 11 carried in a groove 23. Although not shown in FIG. 7, each locking ring 12 has arms extending outward through an aperture as shown in FIG. 2.

Each of the pipes 20 are standard sprinkler pipes shown in the drawing figures may be cut to length. The grooves 23 must be provided for on the ends of the pipes 20. The grooves 23 may be formed on the external surface by means of a simple tool of a type well-known in the art which will provide external grooving on the pipes 20.

In the illustrative embodiment of the invention, the piping used for the fire sprinkler pipe is a thin wall pipe such as that described in my U.S. Pat. No. 5,131,697 issued Jul. 21, 1992 and assigned to a common assignee. The grooves on the pipe ends are formed by cold rolling.

It will be apparent to those skilled in the art that various changes may be made to the structures shown and described herein. It is my intention to only describe but one illustrative embodiment. Other embodiments of the invention may be developed. It is my intent that such other embodiments be covered by the claims of this invention without departing from the spirit or scope thereof.

What is claimed is:

1. A sprinkler system comprising:

a first elongated pipe, said first elongated pipe comprising a first end portion adjacent a first end of said first pipe, said first end portion having a single first circumferential groove on the external surface of said first pipe, said first groove being spaced apart from first end of said first elongated pipe by a predetermined distance;

a second elongated pipe, said second elongated pipe comprising a first end portion adjacent a first end of said second pipe, said first end portion having a single first circumferential groove on the external surface of said second pipe, said second pipe first groove being spaced apart from said first end of said second pipe section by said predetermined distance;

a pipe coupler for receiving and joining said first and said second elongated pipe sections, said pipe coupler comprising:

a single piece cylindrical sleeve, said sleeve comprising first and second end portions, said first end portion receiving said first end of said first elongated pipe and said second end portion receiving said first end of said second elongated pipe, said first end portion having first and second interior circumferential grooves on the interior surface of said sleeve, said second end portion having first and second interior circumferential grooves on said interior surface, said first end portion first circumferential groove being spaced apart from the end of said first end portion by a predetermined distance, said second end portion first circumferential groove being spaced apart from the end of said second end portion by said predetermined distance, said first end portion second circumferential groove being spaced apart from said first end portion end by a second predetermined distance, said second end portion second circumferential groove being spaced apart from said second end portion end by said second predetermined distance, said first and second end portion first circumferential grooves each having both sidewalls extending substantially perpendicular to said interior surface of said coupler; said coupler further comprising:

a lock ring retained and carried in said first end portion first circumferential groove, a second lock ring carried in said sleeve second end portion first circumferential groove, a first seal ring carried in said sleeve first end portion second circumferential groove, a second seal ring carried in said sleeve second end portion second circumferential groove, said first lock ring being movable from a relaxed state to permit insertion of said first,pipe end portion into said sleeve first end portion, said first lock ring engaging said first pipe first circumferential groove to limit all axial movement of said first pipe relative to said sleeve, and said first seal ring sealingly engages said first pipe external surface, said second lock ring being movable from a relaxed state to permit insertion of said second pipe end portion into said sleeve second end portion, said second lock ring having a relaxed state such that when said second lock ring engages said second pipe first groove said second lock ring limits all axial movement of said second pipe relative to said sleeve, and said second seal ring sealingly engages said second pipe external surface; said first and second lock rings each being irremovable from said coupler while each respective said first and second pipe is inserted in said coupler, and wherein said sleeve first end portion first groove comprises a first aperture extending through said sleeve, and said first lock ring comprises first and second arms extending outward through said first aperture, said first and second arm being movable to urge said lock ring from said relaxed state into engagement with the bottom surface of said first end portion first groove whereby said first pipe first end may be inserted into said sleeve past said first lock ring.

2. A system in accordance with claim 1, wherein:

said sleeve second end portion first groove comprises a second aperture extending through said sleeve, and said second lock ring comprises first and second arms extending outward through said second aperture, said first and second arms being movable to urge said second lock ring from said relaxed state into engagement with said second groove whereby said second pipe first end may be inserted into said sleeve beyond said second lock ring.

3. A system in accordance with claim 1, wherein:

said first and said second seal rings are each of generally circular cross-section.

4. A system in accordance with claim 1, wherein:

each of said sleeve first end portion second groove and said sleeve second end portion second groove is of cross-section which conforms to said first seal ring and said second seal ring, respectively.

5. A system in accordance with claim 1, wherein:

each of said first lock ring and said second lock ring is of rectangular cross-section.

6. A system in accordance with claim 1, wherein:

said first lock ring and said second lock ring are each of circular cross-section.

7. A system in accordance with claim 1, wherein:

said first pipe, said second pipe, and said sleeve are of metal construction.

8. A system in accordance with claim 7, wherein:

each of said sleeve first end portion first and second grooves and said sleeve second end portion first and second grooves is cold formed.

\* \* \* \* \*